United States Patent [19]
Nakajima et al.

[11] Patent Number: 5,802,476
[45] Date of Patent: Sep. 1, 1998

[54] CORDLESS TELEPHONE SYSTEM HAVING BASE UNIT WITH SPEAKER

[75] Inventors: Kazunori Nakajima, Saitama; Toshiharu Tajiri, Kanagawa; Hidekazu Sato, Saitama; Hiroshi Miyamoto, Chiba; Takashi Enomoto, Tokyo; Tsutomu Iwaoka, Kanagawa, all of Japan

[73] Assignee: Sony Corporation, Tokyo, Japan

[21] Appl. No.: 581,331

[22] Filed: Dec. 29, 1995

[30] Foreign Application Priority Data

Jan. 18, 1995 [JP] Japan .................. 7-023444

[51] Int. Cl.⁶ .................................................. H04Q 7/30
[52] U.S. Cl. .................. 455/462; 455/550; 455/562; 455/559; 455/575
[58] Field of Search .................. 379/61, 58, 59, 379/63, 56; 455/462, 550, 562, 561, 559, 575

[56] References Cited

U.S. PATENT DOCUMENTS

| | | |
|---|---|---|
| 5,086,452 | 2/1992 | Ito et al. .................. 455/462 |
| 5,220,594 | 6/1993 | Ohnishi et al. .................. 379/61 |
| 5,327,481 | 7/1994 | Horimoto .................. 379/58 |
| 5,528,666 | 6/1996 | Weigand et al. .................. 379/58 |
| 5,572,575 | 11/1996 | Yamamoto et al. .................. 379/58 |
| 5,572,757 | 11/1996 | Yamamoto et al. .................. 379/58 |

*Primary Examiner*—Dwayne D. Bost
*Assistant Examiner*—Keith Ferguson
*Attorney, Agent, or Firm*—Jay H. Maioli

[57] ABSTRACT

In a cordless telephone set, a base unit which itself has no loudspeaker function is made to provide a loudspeaker function at low cost. The base unit 2 has a transmitting circuit 22 for transmitting an aural signal and data to the handset 1 and a receiving circuit 23 for receiving and extracting the aural signal and data transmitted from the handset 1. A line interface circuit 25 coupled to a telephone line 3, a loudspeaker 44, and a selector circuit 28 for switching connection of the aural signal line between the transmitting circuit 22, the receiving circuit 23, the interface circuit 25, and the loudspeaker 44 are provided. In normal use, the transmitting circuit 22 and the receiving circuit 23 of the base unit 2 are connected with the line interface circuit 25 via the selector circuit 28. When predetermined push buttons 17 on the handset 1 are operated, the base unit 2 controls the selector circuit 28 so that the telephone line 3 is connected to the loudspeaker 44 via the selector circuit 28.

10 Claims, 3 Drawing Sheets

| # CORDLESS TELEPHONE SYSTEM HAVING BASE UNIT WITH SPEAKER

FIELD OF THE INVENTION

The present invention relates to a cordless telephone set. Further, it specifically relates to a cordless telephone set having a base unit incorporating a speaker.

BACKGROUND OF THE INVENTION

For example, each room in an average American home is equipped with a modular telephone jack. Therefore, if a cordless telephone is used, a base unit is often installed in each room.

As a cordless telephone set, that which is shown in FIG. 1 is of a type which is generally used. A handset 1 includes a transmitter, a receiver, and push buttons. Since the base unit 2 does not have a transmitter, receiver, and push buttons, the base unit is a dedicated repeater between the handset 1 and a telephone line 3.

Generally, various services such as a time service, weather service, and ticket reservation services can be received through telephones.

However, where such services are utilized with the cordless telephone set shown in FIG. 1, if the user enters numerals through the push buttons, the user must manually hold the handset 1 so that he or she can push the push buttons, and when listening to this information, the user must hold the handset 1 against his or her ear. In this way, the telephone set is not convenient to handle. In particular, in the case of an interactive service such as ticket reservations and bank balance inquiries, the user listens to instructions from the other party and operates the push buttons according to the instructions, in which case the telephone is most inconvenient to use.

Also, there are also telephones in which the base unit 2 is equipped with an automatic answering machine function. Even with this cordless telephone, if the push buttons are operated to play back messages or the like, the handset 1 is manually held so that the push buttons can be operated. When the reproduced messages are heard, the user must hold the handset 1 against his or her ear. Again, this cordless telephone is not convenient to use.

SUMMARY OF THE INVENTION

The novel cordless telephone set comprises a handset and a base unit, the handset having a transmitter, a transmitting circuit for transmitting an aural signal and data from the transmitter to the base unit, a receiving circuit for receiving and extracting the aural signal and data coming from the base unit, a receiver for receiving the aural signal extracted from the receiving circuit, and various operating buttons, and the base unit having a transmitting circuit for transmitting an aural signal and data to the handset, a receiving circuit for receiving and extracting the aural signal and data coming from the handset, a telephone line interface circuit connected to a telephone line, a loudspeaker, and a switching circuit for switching the connection of the aural signal line between the transmitting circuit, the receiving circuit, the telephone line interface circuit and the loudspeaker. In normal use, the transmitting circuit and the receiving circuit of the base unit are connected with the telephone line interface circuit via the switching circuit. When a predetermined button among the operating buttons on the handset is pushed, data indicating the operation is sent from the handset to the base unit and the base unit then controls the switching circuit according to the sent data in such a way that the telephone line is connected with the loudspeaker via the switching circuit.

When using a telephone service, when operating the push buttons or listening to voice instructions, by operating the buttons of the handset, the other party's voice can be output from the speaker of the base unit without the necessity of changing the position of the handset.

BRIEF DESCRIPTION OF THE DRAWINGS

These and other features, aspects and advantages of the present invention will become better understood with reference to the following description, appended claims and accompanying drawings.

DETAILED DESCRIPTION OF THE INVENTION

Figure 1:
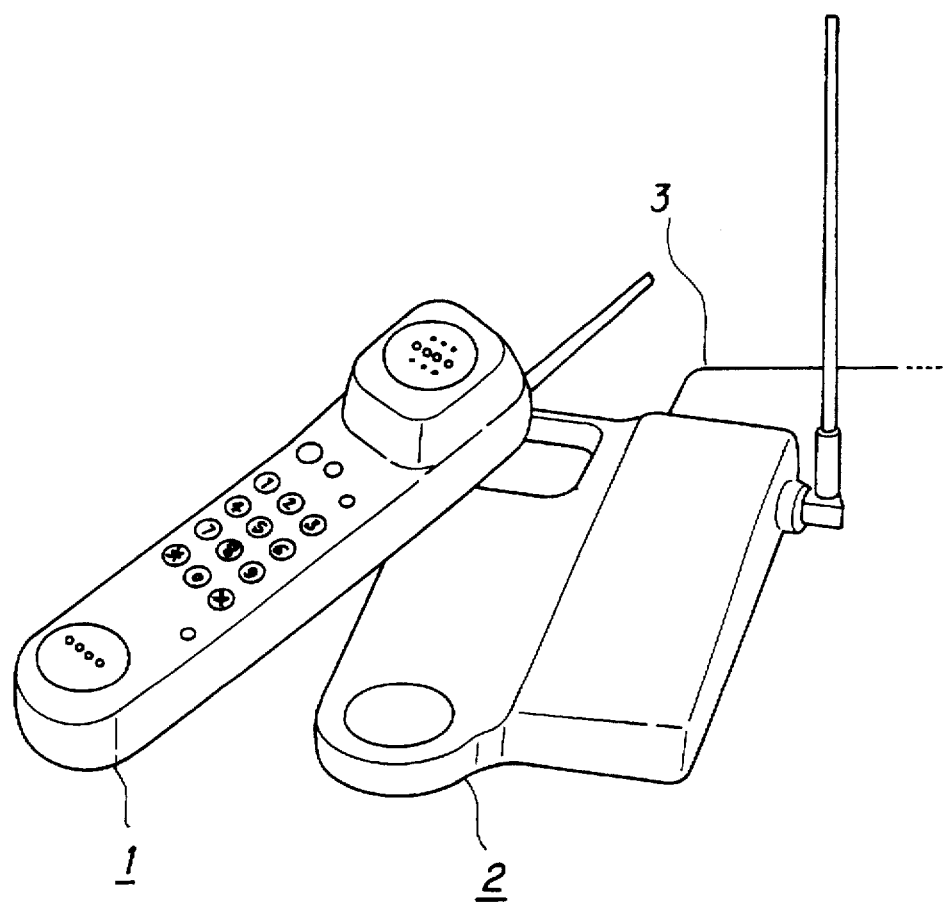
FIG. 1 is an external view of a common cordless telephone set.
Figure 2:
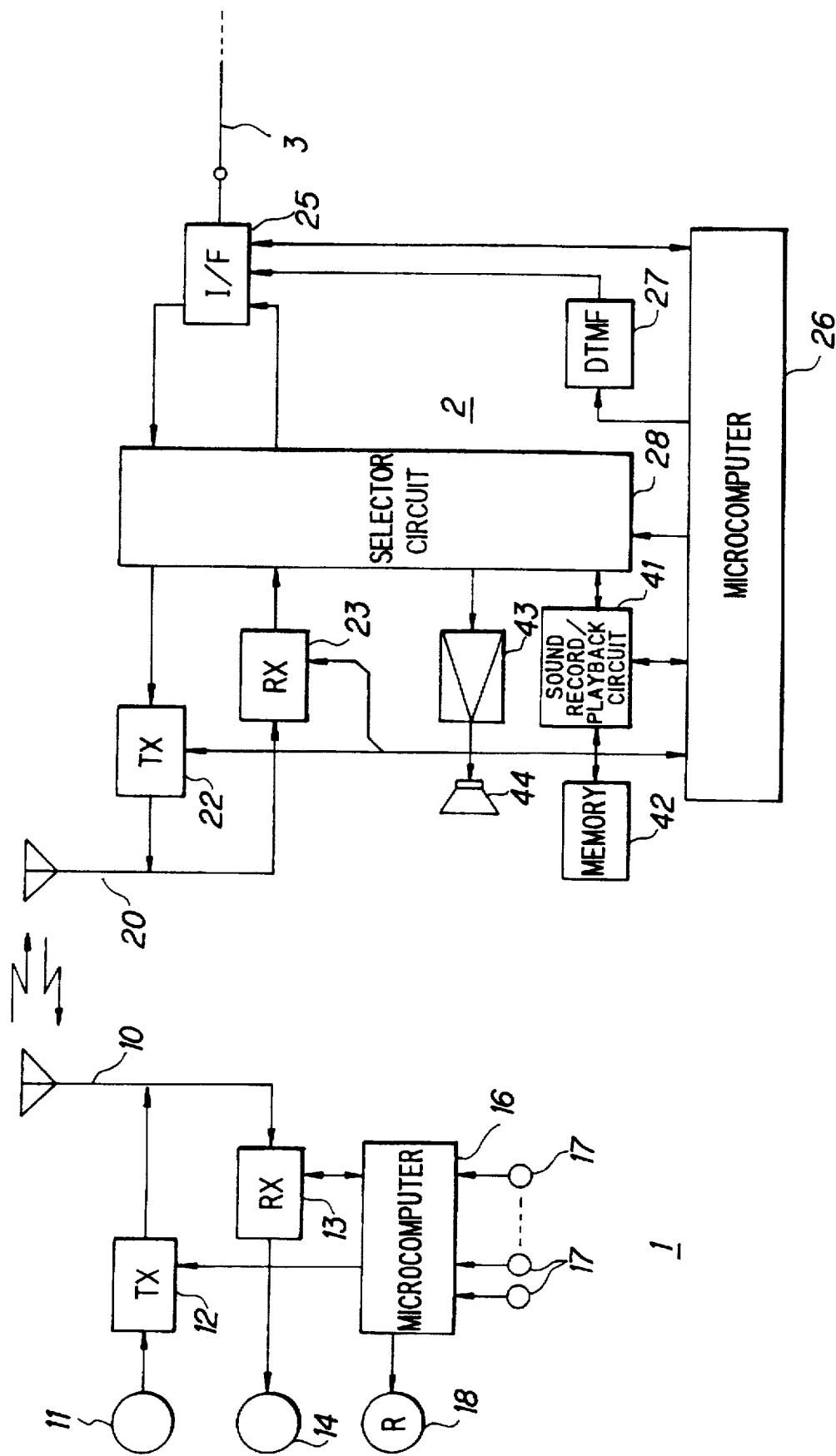
FIG. 2 is a block diagram a cordless telephone set according to a first embodiment of this invention.

In the embodiment shown in FIG. 2, the base unit is equipped with an automatic answering machine function, the handset 1 is connected to the base unit 2 by a wireless circuit, and the base unit 2 is connected to a telephone line.

In the handset 1, a transmitter 11 is connected to a transmitting circuit for converting a speech signal of the user himself or herself and various kinds of data into an FM signal in the upward channel and for sending the FM signal, and a receiving circuit 13 for receiving an FM signal in the downward channel and for extracting the speech signal of the other party and various kinds of data is connected to a receiver 14.

A microcomputer 16 for controlling the system performs various controls according to the operations of a variety of push buttons 17, and also controls a ringer 18 for notifying the user of incoming calls. The transmitting circuit 12 and the receiving circuit 13 are controlled by the microcomputer 16. Data sent from the transmitting circuit 12 and data received by the receiving circuit 13 are produced or discriminated by the microcomputer 16.

Meanwhile, the base unit 2 is similar in construction to the handset 1, and thus has a transmitting circuit 22 for the downward channel to send signals to the handset, a receiving circuit 23 for the upward channel to receive signals from the handset, an interface circuit 25, and a microcomputer 26 for controlling the system.

In this case, the interface circuit 25 includes a 4-line/2-line converter circuit, a switch circuit for opening and acquiring a telephone line 3, a detection circuit for detecting a ringer signal when an incoming call is received, etc. and is connected with the microcomputer 26.

Also, a DTMF (dual tone modulation frequency) signal generating circuit 27 and a selector circuit (switching circuit) 28 are connected to the microcomputer 26. The selector circuit 28 comprises a plurality of switch circuits (not shown), and is connected with the voice signal lines of the transmitting circuit 22 and the receiving circuit 23 and also with the voice signal line of the interface circuit 25. The selector circuit 28 is controlled in various connection formats by the microcomputer 26, as described in detail below.

Further, a sound-recording-and-playback circuit 41 for an automatic answering machine function, in this example, records or plays back digital speech signals such as outgoing messages (OGM: answering messages for informing the other party that the user is absent when an incoming call is made) and incoming messages (ICM: messages indicating the content of information from another party) in a memory 42.

As a result, the sound-recording-and-playback circuit 41 has an A/D converter for converting analog speech signals such as OGMs and ICMs into digital form, a D/A converter for converting digital signals into analog form, and a control circuit for controlling addresses in the memory 42 and writing and reading to and from the memory 42. The speech signal line of the sound-recording-and-playback circuit 41 is also connected with the selector circuit 28. The entire operation of the sound-recording-and-playback circuit 41 is controlled by the microcomputer 26.

Further, the base unit 2 is equipped with a loudspeaker 44, and its the selector circuit 28 connected with the loudspeaker 44 via an amplifier 43.

The cordless telephone set is operated by processing performed by the microcomputers 16 and 26 in the manner described below.

During telephone conversations

In this case, the selector circuit 28 is controlled by the microcomputer 26. The transmitting circuit 22 and the receiving circuit 23 are connected with the interface circuit 25 via the selector circuit 28.

When the user is communicating with another party on the external line, the aural signal from the transmitter 11 is supplied to the transmitting circuit 12 and converted into an FM signal in the upward channel. This FM signal is sent to the base unit 2 from an antenna 10.

Then, in the base unit 2, the FM signal sent from the handset 1 is received by the antenna 20 and supplied to the receiving circuit 23. The aural signal from the handset 1 is extracted from the receiving circuit 23. Then the aural signal from the receiving circuit 23 is sent to the telephone line 3 via the selector circuit 28 and the interface circuit 25.

The aural signal from the other party is supplied from the telephone line 3 via the interface circuit 25 and through the selector circuit 28 to the transmitting circuit 22. The aural signal supplied to the transmitting circuit 22 is converted into an FM signal in the downward channel and this FM signal is transmitted to the handset 1 from the antenna 20.

Then, in the handset 1, the FM signal sent from the base unit 2 is received by the antenna 10 and supplied to the receiving circuit 13, where the aural signal of the other party is extracted, then this aural signal is supplied to the receiver 14. Accordingly, the user can conduct a telephone conversation with the other party on the external line by using the handset 1.

When making an outgoing call

When the conversation button among the push buttons 17 on the handset 1 is pushed, the microcomputer 16 produces data for a command indicating a request for an outgoing call. This data is supplied to the transmitting circuit 12 and sent to the base unit 2 by an upward channel FM signal.

Then, when the FM signal from the handset 1 is received in the base unit 2, data of the command for the outgoing call request is extracted from the receiving circuit 23 and this data is supplied to the microcomputer 26. Then since the data, in this case, is the command for the outgoing call request, predetermined protocols are executed between the handset 1 and the base unit 2 and the handset 1 and the base unit 2 are linked through a channel using electromagnetic waves.

The selector circuit 28 is controlled by the microcomputer 26, and the transmitting circuit 22 and receiving circuit 23 are connected with the interface circuit 25 via the selector circuit 28. The interface circuit 25 is placed in an off-hook state and a telephone line 3 is acquired.

Thus, upon the telephone number of the other party being entered using the push buttons 17 on the handset 1, data indicating the telephone number is transmitted to the base unit 2 from the handset 1. In the base unit 2, the microcomputer 26 controls the generating circuit 27 based on the transmitted telephone number data. A DTMF signal corresponding to the telephone number is produced and sent to the telephone line 3 via the interface circuit 25.

Accordingly, if the telephone of the other party is called thereafter and the other party answers the call, the user can then conduct a telephone conversation with the other party through the use of the handset 1.

When an incoming call is made in a normal mode

When an incoming call is made, the corresponding ringer signal is supplied from the interface circuit 25 to the microcomputer 26, which in turn detects the incoming call. Since the mode of operation is the normal mode, the microcomputer 26 creates data about a command indicating a request for an incoming call. This data is supplied to the transmitting circuit 22 and then to the handset 1 by means of an FM signal in the downward channel.

Upon the FM signal from the base unit 2 being received by the handset 1, the command data for an incoming call request is extracted from the receiving circuit 13 and this data is supplied to the microcomputer 16. Since this data is a command for an incoming call request at this time, predetermined protocols are executed between the base unit 2 and the handset 1 and the base unit 2 and the handset 1 are connected through a channel by means of electromagnetic waves. In the handset 1, the ringer 18 is activated, thus informing the user of an incoming call.

Upon the user depressing the conversation button among the push buttons 17 on the handset 1, data indicating this is created and sent to the base unit 2. Then predetermined protocols are executed, and as a result the selector circuit 28 is controlled by the microcomputer 26 and the transmitting circuit 22 and receiving circuit 23 are connected with the interface circuit 25 via the selector circuit 28. The interface circuit 25 is placed in an off-hook state and the telephone line 3 is acquired.

Accordingly, thereafter the user can subsequently conduct a telephone conversation with the other party by using the handset 1 as described above.

When incoming calls are received in the automatic answering mode

When there is an incoming call, the ringer signal is supplied from the interface circuit 25 to the microcomputer 26, whereby the incoming call is detected. Since the mode of operation in this case is the automatic answering mode, the interface circuit 25 is placed in an off-hook state and the telephone line 3 is acquired. The selector circuit 28 is controlled so that the sound-recording-and-playback circuit 41 is connected with the interface circuit 25 through the selector circuit 28.

Also, a command indicating playback of the OGM is supplied to the sound-recording-and-playback circuit 41 from the microcomputer 26. Read out from the memory 42 is controlled by the sound-recording-and-playback circuit 41 to extract the digital aural signal of the OGM.

Then, this digital signal is converted into an analog aural signal by the sound-recording-and-playback circuit 41. This D/A converted OGM aural signal is passed through the selector circuit 28 and further through the interface circuit 25 to be sent to the telephone line 3. Accordingly, the other party which is calling hears the OGM.

Upon conclusion of playback of the OGM, the microcomputer 26 supplies a command for indicating recording of the ICM in the sound-recording-and-playback circuit 41. The sound-recording-and-playback circuit 41 controls writing into the memory 42, establishing an ICM recording mode. Accordingly, if the other party leaves an ICM, the aural signal thereof is sent from the telephone line 3 and supplied to the sound-recording-and-playback circuit 41 through the interface circuit 25 and the selector circuit 28. The analog ICM aural signal is converted into digital form and supplied to the memory 42.

Accordingly, the digital aural signal of the ICM is written into the memory 42, i.e. the ICM is recorded.

Upon passing of a given time, or upon the other party hanging up, recording of the ICM is concluded. The interface circuit 25 is placed in an on-hook state and the telephone line 3 is opened. Thereafter, the cordless telephone is placed in a standby condition.

When a telephone service is received

In this case, the user moves close to the base unit 2 to a position where speech output from the loudspeaker 44 of the base unit 2 can easily be heard. Then, the user depresses a program button, for example, included among the push buttons 17 on the handset 1, and subsequently pushes the conversation button.

The microcomputer 16 then produces command data for indicating a request for an outgoing call in the telephone service mode. The data is transmitted to the base unit 2 in the same way as when an outgoing call is made as mentioned previously, whereafter the handset 1 and the base unit 2 are linked through a channel using electromagnetic waves.

Subsequently, the selector circuit 28 is controlled by the microcomputer 26, and at the same time that the receiving circuit 23 is connected with the interface circuit 25 through the selector circuit 28, the interface circuit 25 is connected with the amplifier 43 via the selector circuit 28. Further, the interface circuit 25 is placed in an off-hook state and the telephone line 3 is acquired.

Accordingly, from this point on, a connection tone signal indicating that the telephone line 3 has been acquired is supplied from the telephone line 3 to the amplifier 43 through the interface circuit 25 and the selector circuit 28. A connection tone is output from the loudspeaker 44.

Upon entering the telephone number of the other party wishing to receive the telephone call by pushing the push buttons for dialing among the push buttons 17 on the handset 1, data indicating the telephone number is transmitted from the handset 1 to the base unit 2. The generating circuit 27 of the base unit 2 creates a DTMF signal corresponding to the incoming telephone number data and this signal is sent to the telephone line 3 through the interface circuit 25. Accordingly, thereafter the other party who is to receive the telephone service is called.

If the other party answers, an aural signal indicating this response is supplied to the loudspeaker 44 via a signal line similar to the line used by the connection tone signal in the telephone line 3. The loudspeaker 44 outputs a tone indicating response. Therefore, the user can hear the speech of the other party during the phone service through the loudspeaker 44.

In this case, if the user pushes push buttons for dialing among the push buttons 17, data indicating the depressed push buttons is transmitted to the base unit 2. Then the generating circuit 27 creates a corresponding DTMF signal and sends it to the telephone line 3, whereby the user can receive interactive services such as ticket services. Also at this time, the user can hear the other party's speech through the loudspeaker 44 while manually holding the handset 1 in such a way that the user can easily depress the push buttons.

The program button among the push buttons 17 of the handset 1 can not only be pushed before the conversation button is pushed, but may also be pushed during a conversation. In this case, by pushing the program button, the interface circuit 25 is connected to the amplifier 43 through the selector circuit 28 from the middle of the conversation.

Further, when the program button is pushed again, command data indicating conclusion of the telephone service mode is generated in the microcomputer 16 of the handset 1. This command data is transmitted to the main unit 2, the selector circuit 28 is controlled by the microcomputer 26, and the connection between the selector circuit 28 and the amplifier 43 is disconnected.

Note that in this telephone service mode, as well as the selector circuit 28 and the amplifier 43 being connected, the connection between the transmitting circuit 22 and the selector circuit 28 may be disconnected. In this case, since an aural signal is not transmitted from the main unit 2 to the handset 1, the user can only hear sound from the speaker 44 of the main unit 2.

Playback of ICM

Also in this case, the user moves close to the base unit 2 to a position where speech output from the loudspeaker 44 of the base unit 2 can easily be heard. Then the user pushes the program button, for example, among the push buttons 17 on the handset 1, and subsequently depresses the playback button.

After this, command data for indicating the ICM playback mode is produced in the microcomputer 16. The data is sent to the base unit 2 in the same manner as when an outgoing call is made as described above, and the handset 1 and the base unit 2 are linked through a channel by electromagnetic waves.

Subsequently, the selector circuit 28 is controlled by the microcomputer 26, and the sound-recording-and-playback circuit 41 is connected with the amplifier 43 via the selector circuit 28.

A command is supplied to the sound-recording-and-playback circuit 41 from the microcomputer 26 to indicate playback of the ICM. Read out from the memory 42 is controlled by the sound-recording-and-playback circuit 41 to extract an ICM digital aural signal. Then this digital signal is converted into analog form in the sound-recording-and-playback circuit 41. The converted ICM aural signal is supplied to the amplifier 43 via the selector circuit 28.

Accordingly, the loudspeaker 44 produces a tone indicating the ICM in response to the aural signal read from the memory 42.

Also, at this time, upon the user operating predetermined buttons among the push buttons 17, data indicating the operated push buttons is sent to the base unit 2 to be discriminated by the microcomputer 26. The state of playback of the ICM is modified according to the operated push buttons, and repeat playback, playback of the next ICM, or the like is carried out.

If the user depresses only the playback button of the push buttons 17, the handset 1 and the base unit 2 are linked through a channel by electromagnetic waves, and in addition the sound-recording-and-playback circuit 41 is connected with the transmitting circuit 22 via the selector circuit 28. In this case, therefore, the ICM can be heard through the receiver 14 of the handset 1.

Summary

As described above, this cordless telephone allows the user to hear the sound of the aural signal sent through the telephone line 3 by means of the loudspeaker 44. Therefore, when a telephone service is received, the sound from the telephone service can be heard while the user holds the handset 1 in such a way that the push buttons 17 can be operated.

Consequently, when the push buttons are pushed or when sound from a phone service is heard, it is not necessary to perform cumbersome operations such as holding the handset 1 so as to be able to handle the push buttons 17 or putting the handset 1 against the ear. In this way, the telephone is convenient to use. Especially, in the case of an interactive service such as ticket reservations and bank balance inquiries, the push buttons are pushed in response to successive instructions from the other party. In this way, the telephone is more convenient to use.

Furthermore, when an ICM is heard, it can be heard through the loudspeaker 44 while holding the handset 1 in such a way that the push buttons can be easily operated.

Since the loudspeaker 44 is installed in the base unit 2, an increase in the size and weight of the handset 1 is prevented. Moreover, the enclosure or cabinet of the base unit 2 can be made suitable for the loudspeaker 44, hence sound can be heard with quality and volume adapted for the user.

Additionally, such effects can be obtained simply by adding the amplifier 43 and the loudspeaker 44 to the base unit 2, thus reducing the cost.

Second Embodiment

As mentioned previously, sound from a phone service or the like is heard through the loudspeaker 44 of the base unit 2. Therefore, when the sound is heard, the user of the handset 1 is required to be close to the base unit 2.

Figure 3:
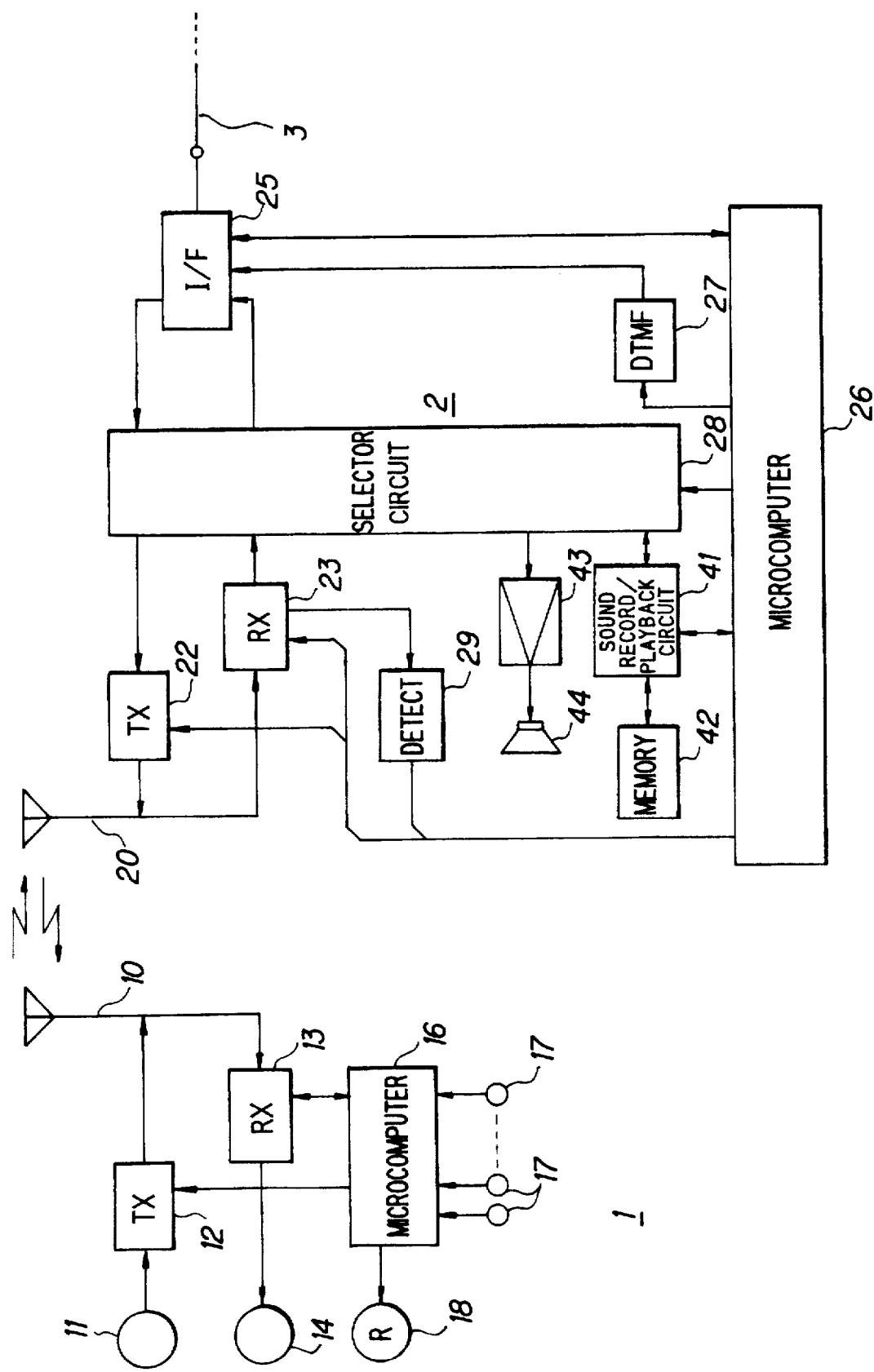
FIG. 3 is a block diagram of a cordless telephone set according to a second embodiment of this invention.

In view of this point, in the example shown in FIG. 3, sound is automatically produced from the loudspeaker 44 when the user is close to the base unit 2 without needing any special operations on the push buttons.

That is, in this embodiment, a detector circuit 29 is connected with the receiving circuit 23 of the base unit 2. A signal indicating the level of the electric field of the received FM signal in the upward channel from the handset 1 is extracted. This output signal is supplied to the microcomputer 26.

In this case, if the handset 1 is used close to the base unit 2, the level of the electric field of the received FM signal from the handset 1 is strong and if the handset 1 is used at a distance from the base unit 2, then the level of the electric field of the received FM signal from the handset 1 is weak. Therefore, it is possible to know from the output signal of the detector circuit 29 whether the handset 1 is located close to or distant from the base unit 2.

If the push buttons are operated to make an outgoing call, processing for the outgoing call is performed as described above. At this time, the microcomputer 26 checks the output signal from the detector circuit 29 to judge whether the handset 1 is used close to the base unit 2 or distant from it.

If the handset 1 is used close to the base unit 2, processing similar to processing conducted when a telephone service is received as described above is carried out. The interface circuit 25 is connected with the amplifier 43 through the selector circuit 28. The receiving circuit 23 is connected with the interface circuit 25 via the selector circuit 28.

Accordingly, when a telephone service is received, the push buttons can be pushed while holding the handset 1 by hand. Also, the other party's speech can be heard through the loudspeaker 44.

However, if the handset 1 is employed at a distance from the base unit 2, processing similar to processing conducted when an outgoing call is made as described above is carried out. A telephone conversation can be conducted using the transmitter 11 and the receiver 14 of the handset 1 in the same way as in the case of an ordinary cordless telephone.

If some of the push buttons on the handset 1 are pushed for playback of an ICM, processing for playback of the ICM is performed as mentioned previously. At this time, the microcomputer 26 checks the output from the detector circuit 29, whereby the microcomputer judges whether the handset 1 is used close to or at a distance from the base unit 2.

If the handset 1 is used close to the base unit 2, processing similar to the processing conducted in the case of playback of ICM as described above is carried out. The sound-recording-and-playback circuit 41 is connected with the amplifier 43 via the selector circuit 28. Therefore, when the aural signal of the ICM is read from the memory 42, the ICM is output from the loudspeaker 44.

However, if the handset 1 is used at a distance from the base unit 2, the sound-recording-and-playback circuit 41 is connected with the transmitting circuit 22 via the selector circuit 28. Hence, the ICM can be heard through the receiver 14 of the handset 1.

In this example, whether the handset 1 is used close to the base unit 2 is detected and the selector circuit 28 is controlled according to the result, thus if sound is produced from the loudspeaker 44, no special operation of the push buttons is necessary. The same operations on the push buttons are carried out whether sound is produced from the loudspeaker 44 or heard through the receiver 14 of the handset 1.

Other Embodiments

In the foregoing description, although the cordless telephone has an automatic answering function, this is not necessary. Also in the foregoing description, although when specified buttons among the push buttons 17 are operated in combination, sound is produced from the loudspeaker 44, dedicated push buttons or keys may also be provided.

Furthermore, in the above description, aural signals for ICMs and OGMs are written into and read out from the memory 42. Conventional cassette tape or the like may be utilized in this memory 42.

What is claimed is:

1. A cordless telephone system comprising:
   a handset including:
      a plurality of push buttons including a program push button;
      control signal generator means for generating a control signal based on operations of said plurality of push buttons and for generating a telephone service mode signal upon pressing said program push button during a telephone conversation and for ceasing generating of said telephone service mode signal upon a subsequent pressing of said program push button;
      transmission means for transmitting signals to a base unit; and
      receiving means for receiving signals from a base unit;
   a base unit including:
      transmission means for transmitting signals to said handset;
      receiving means for receiving signals including said telephone service mode signal from said handset;
      a telephone line interface circuit coupled to a telephone line;
      amplification means, coupled to a speaker, for amplifying audio signals;

switching means, coupled to said telephone line interface circuit and said amplification means, for switching on and off a connection with said amplification means; and control means, coupled to said switching means and said receiving means, for controlling said switching means to connect said interface circuit to said amplification means for output of the audio signals when the telephone service mode signal is received by said receiving means in said base unit and to connect said receiving means to said interface circuit to couple said control signal to said telephone line.

2. A cordless telephone system comprising:

a handset including:

a plurality of push buttons including a program push button;

control signal generator means for generating a control signal based on said push button operations including generating a telephone service mode signal upon pressing said program push button and for ceasing generating said telephone service mode signal upon a subsequent pressing of said program push button;

transmission means for transmitting signals to a base unit; and receiving means for receiving signals from a base unit;

a base unit including:

transmission means for transmitting signals to said handset;

receiving means for receiving signals including said control signal and said telephone service mode signal from said handset;

a telephone line interface circuit coupled to a telephone line;

amplification means, coupled to a speaker, for amplifying audio signals;

switching means, coupled to said transmission means, said telephone line interface circuit and said amplification means, for switching a connection with said transmission means and a connection with said amplification means; and control means, coupled to said switching means and said receiving means, for controlling said switching means to connect said interface circuit to said amplification means for outputting the audio signals when the telephone service mode signal is received and to connect said receiving means to said interface circuit to couple said control signal to said telephone line.

3. The cordless telephone system of claim 1, wherein said base unit further includes sound-recording-and-playback means coupled to said switching means, for recording and playing back an audio signal.

4. The cordless telephone system of claim 2, wherein said base unit further includes sound-recording-and-playback means coupled to said switching means, for recording and playing back an audio signal.

5. A cordless telephone system comprising:

a handset including:

transmission means for transmitting signals to a base unit; and receiving means for receiving signals from a base unit;

a base unit including:

transmission means for transmitting signals to said handset;

receiving means for receiving signals from said handset;

a telephone line interface circuit coupled to a telephone line;

amplification means, coupled to a speaker, for amplifying audio signals;

switching means, coupled to said telephone line interface circuit and said amplification means, for switching a connection with said amplification means on and off;

detection means, coupled to said receiving means, for detecting an electric field strength of said signals from said handset; and control means, coupled to said switching means and said detection means, for controlling said switching means based on said electric field strength to connect said interface circuit to said amplification means for outputting the audio signals when the detected electric field strength is strong.

6. A cordless telephone system comprising:

a handset including:

transmission means for transmitting signals to a base unit; and receiving means for receiving signals from a base unit;

a base unit including:

transmission means for transmitting signals to said handset;

receiving means for receiving signals from said handset;

a telephone line interface circuit coupled to a telephone line;

amplification means, coupled to a speaker, for amplifying audio signals;

switching means, coupled to said transmission means, said telephone line interface circuit and said amplification means, for switching a connection with said transmission means and a connection with said amplification means;

detection means, coupled to said receiving means, for detecting an electric field strength of said signals from said handset; and control means, coupled to said switching means and said detection means, for controlling said switching means based on the detected electric field strength to connect said interface circuit to said amplification means for outputting the audio signals when the detected electric field strength is stronger than a weak level.

7. A communication method in a cordless telephone system having a base unit attached to a telephone line and a handset with a plurality of buttons, said method comprising the steps of:

transmitting from said base unit a telephone line audio signal received through said telephone line;

receiving in said handset the telephone line audio signal from said base unit;

transmitting a signal from said handset to said base unit;

receiving in said base unit the signal from said handset; and outputting said telephone line audio signal by means of a speaker in said base unit when said base unit receives the telephone service mode signal produced by operating said program button in said handset; and ceasing outputting said telephone line audio signal upon a subsequent dressing of the program button.

8. A communication method in a cordless telephone system having a base unit attached to a telephone line and a handset with a plurality of buttons including a program button, said method comprising the steps of:

transmitting from said base unit a telephone line audio signal received through said telephone line;

receiving in said handset the telephone line audio signal from said base unit;

transmitting control signals upon pressing said buttons and a telephone service mode signal upon pressing said program button from said handset to said base unit;

receiving in said base unit the signals from said handset; and switching in said base unit between transmitting and outputting said telephone line audio signal by means of a speaker, when said base unit receives said telephone service mode signal produced by operating said program button in said handset; and coupling said control signals to said telephone line when the base station receives said telephone service mode signal.

9. A communication method in a cordless telephone system having a base unit attached to a telephone line and a handset with a plurality of buttons, said method comprising the steps of:

transmitting from said base unit a telephone line audio signal received through said telephone line;

receiving in said handset the telephone line audio signal from said base unit;

transmitting a signal from said handset to said base unit;

receiving in said base unit the signal from said handset;

detecting at said base unit a level of an electric field strength of the signal from the handset; and outputting said telephone line audio signal by means of a speaker in said base unit when the level of the electric field strength of the signal from said handset is strong.

10. A communication method in a cordless telephone system having a base unit attached to a telephone line and a handset with a plurality of buttons, said method comprising the steps of:

transmitting from said base unit a telephone line audio signal received through said telephone line;

receiving in said handset the telephone line audio signal from said base unit;

transmitting control signals generated upon pressing said buttons from said handset to said base unit;

receiving in said base unit the signals from said handset; and switching in said base unit between transmitting the telephone line audio signal at the base unit to outputting said telephone line audio signal by means of a speaker, when an electric field strength of the signal from said handset is detected at the base unit to be strong.

\* \* \* \* \*